Feb. 3, 1925.

E. E. GREVE

SAFETY HOOK

Filed March 21, 1924

1,525,292

INVENTOR

Edgar E. Greve
by W. B. Doolittle
his attorney.

Patented Feb. 3, 1925.

1,525,292

UNITED STATES PATENT OFFICE.

EDGAR E. GREVE, OF BELLEVUE, PENNSYLVANIA.

SAFETY HOOK.

Application filed March 21, 1924. Serial No. 700,857.

*To all whom it may concern:*

Be it known that I, EDGAR E. GREVE, a citizen of the United States, residing at Bellevue, in the county of Allegheny and State of Pennsylvania, have invented certain new and useful Improvements in Safety Hooks, of which the following is a specification.

The present invention is for a safety hook of such construction that accidental disengagement with the member to which it is connected is prevented.

The hook is especially designed to meet the requirements of oil and gas drillers for a hook to be used around derricks for handling the bails of swivels, casing elevators, and other equipment, which hook will not disengage itself from the part being manipulated under some conditions, as, for instance, where a part being lowered into a well becomes hung while the hook continues to move down. The invention is not limited to uses in this connection, however, being generally applicable to any kinds of hooks, particularly those used in hoisting operations of any kind.

The invention has for its object to provide a simple catch for hooks, particularly relatively large heavy hooks so constructed as to prevent accidental disengagement from the part to which it is attached.

The invention may be readily understood by reference to the accompanying drawings, in which.

Figure 1:
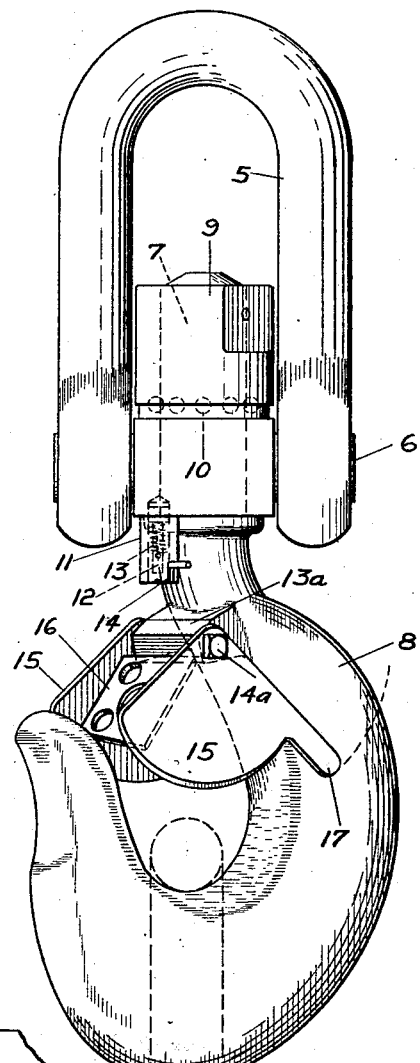
Fig. 1 shows a somewhat perspective view of a hook embodying my invention.
Figure 2:
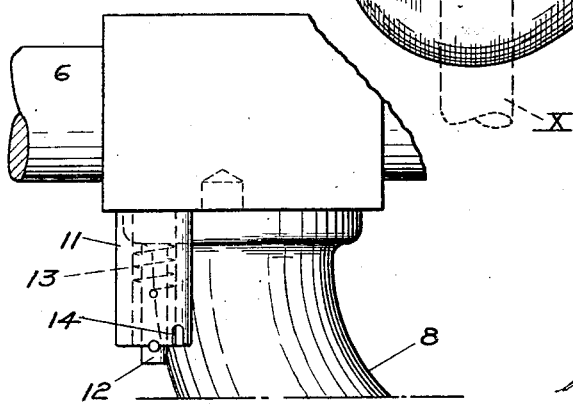
Fig. 2 is a view showing in detail a locking pin construction for the hook.

In the drawings, 5 designates a clevis in which is carried a pivoted cross pin 6. Passing through the cross pin is the shank 7 of a hook 8. Secured to the upper end of the shank is a nut 9 that serves to hold the hook in the cross pin 6. In large hooks, a ball bearing is provided at 10, this construction enabling the hook to swivel in the cross pin. This is a common construction.

Secured to the shank of the hook, below the cross pin, is a tube 11 which may be welded onto the shank of the hook and within which is a reciprocable locking pin 12, urged upwardly by a spring 13. When the pin is in register with a recess 14 in the cross bar 6, the upper end of pin 12 engages in the recess, and the hook is held from turning.

Formed on the hook at the juncture of the stem or shank and the top of the hook is a lug $13^a$. Passing through this lug is a pin or bolt $14^a$ from which is suspended the safety catch. This catch comprises two segment shaped plates 15 having their upper narrow ends pivoted on the pin $14^a$ and having arcuately shaped lower edges. The two plates are connected by a spacer plate 16. One or both plates may be provided with an extension 17, that forms a handle. The extensions 17 counter-balance the spacer plate 16, so that the safety device hangs by gravity, in the position shown in Fig. 1. Hanging in this manner, the plates substantially close the top of the hook.

When it is desired to connect the hook to a bail X or other device, the safety catch swings back, the plate straddling the hook. Now, should the hook tend to move down with respect to the bail X, or the bail X tend to move up with respect to the hook, the bail engages the arcuate edge of the plates, which act as a locking cam and swing to wedge the bail against the hook and prevent the bail from becoming disengaged from the hook. To remove the bail X, the catch need only be swung back manually, thereby opening the top of the hook.

The catch is extremely effective and is simple in its construction, and cheaply manfactured. The catch is also very rugged and well adapted to withstand the strain and rough handling to which devices of this kind are subject.

I claim as my invention:

1. The combination with a hook, of a segment-shaped locking member pivotally carried by the hook and normally hanging across the open top of the hook with its convexed lower edge toward the hook.

2. The combination with a hook having a shank, of a safety catch pivotally carried on the shank and comprising a pair of spaced apart connected cam plates having convexed edges turned toward the hook adapted to normally extend across the upper portion of the hook, said catch being movable toward the shank to an inoperative position in which said spaced apart plates straddle the upper part of the hook.

3. The combination with a hook having a shank, of a safety catch pivotally carried on the shank and comprising a pair of spaced apart connected cam plates adapted to normally extend across the upper portion of the hook, said member being movable toward the shank to an inoperative position in which said spaced apart plates straddle the upper part of the hook, the lower edges of the cam plates being curved to enter into a wedging engagement with any member engaged by the hook and tending to escape from engagement therewith.

4. The combination with a hook having a shank, of a safety catch pivotally carried on the shank and comprising a pair of spaced apart connected plates adapted to normally extend across the upper portion of the hook, said member being movable toward the shank to an inoperative position in which said spaced apart plates straddle the upper part of the hook, the lower edges of the plates being curved to enter into a wedging engagement with any member engaged by the hook that tends to disengage itself from the hook, one of the plates having a downwardly projecting extension adapted to provide a handle.

5. The combination with a hook having a shank and a bill, of a safety catch comprising a plate pivotally suspended from the shank and normally extending down past the open end of the hook below the bill, the lower edge of the plate thereby being in the path of travel of any object engaged by the hook which moves upwardly with respect thereto, said plate being free to swing in either direction upon contact with any such object and having its lower edge convexed in order to guide such object toward a part of the hook and enter into a wedging engagement with said object.

In testimony whereof I affix my signature.

EDGAR E. GREVE.